(12) United States Patent
Davis et al.

(10) Patent No.: US 7,776,485 B1
(45) Date of Patent: *Aug. 17, 2010

(54) FUEL CELL STACK WITH A PLURALITY OF CONNECTED SINGLE UNIT FUEL CELLS

(75) Inventors: Edward Lee Davis, Tigard, OR (US); Benjamin Franklin Schafer, Cornelius, OR (US)

(73) Assignee: Hydro Fuel Cell Corporation, Beaverton, OR (US)

(*) Notice: Subject to any disclaimer, the term of this patent is extended or adjusted under 35 U.S.C. 154(b) by 1125 days.

This patent is subject to a terminal disclaimer.

(21) Appl. No.: 11/437,336

(22) Filed: May 19, 2006

Related U.S. Application Data

(60) Provisional application No. 60/705,600, filed on Aug. 3, 2005, provisional application No. 60/715,697, filed on Sep. 8, 2005, provisional application No. 60/756,442, filed on Jan. 4, 2006.

(51) Int. Cl.
*H01M 8/10* (2006.01)
*H01M 2/00* (2006.01)
*H01M 2/18* (2006.01)

(52) U.S. Cl. .............. 429/458; 429/452; 429/479; 429/517

(58) Field of Classification Search ............... None
See application file for complete search history.

(56) References Cited

U.S. PATENT DOCUMENTS

| | | | |
|---|---|---|---|
| 3,432,356 A | 3/1969 | Christianson | |
| 3,553,023 A | 1/1971 | Doyle | |
| 4,098,959 A | 7/1978 | Fanciullo | |
| 4,243,731 A | 1/1981 | Cheron | |
| 4,310,605 A | 1/1982 | Early et al. | |
| 4,741,978 A | 5/1988 | Takabayashi | |
| 5,334,463 A | 8/1994 | Tajimia et al. | |
| 5,366,821 A | 11/1994 | Merritt et al. | |
| 5,401,589 A | 3/1995 | Palmer et al. | |
| 5,462,815 A | 10/1995 | Horiuchi | |
| 5,877,600 A | 3/1999 | Sonntag | |

(Continued)

FOREIGN PATENT DOCUMENTS

WO    WO 03/058733 A1    7/2003

(Continued)

*Primary Examiner*—Dah-Wei D Yuan
*Assistant Examiner*—Edu E Enin-Okut
(74) *Attorney, Agent, or Firm*—Buskop Law Group, PC; Wendy Boskop

(57) ABSTRACT

A fuel cell stack including a housing for holding fuel cells is disclosed. Each fuel cell includes a membrane electrode assembly with a proton exchange membrane disposed between carbon bases, a connector for engaging metalized collectors to form an electrical circuit for operating the fuel cell stack, and a sealable two-part housing for supporting an oxidant manifold and a fuel manifold that support the membrane electrode assembly and flexible plenums of each fuel cell. The fuel cell stack includes fuel cell connectors for connecting an anode from one fuel cell with a cathode from an adjacent fuel cell, a fuel intake in communication with a fuel source and an oxidant intake in communication with an oxidant source for providing fuel and oxidant into the fuel cell stack, a controller for monitoring and regulating fuel and oxidant, and a fuel manifold engaging fuel intakes and an oxidant manifold engaging oxidant intakes.

20 Claims, 14 Drawing Sheets

U.S. PATENT DOCUMENTS

| | | | |
|---|---|---|---|
| 6,001,499 A | 12/1999 | Grot et al. | |
| 6,017,648 A * | 1/2000 | Jones | 429/35 |
| 6,127,058 A * | 10/2000 | Pratt et al. | 429/30 |
| 6,387,556 B1 | 5/2002 | Fuglevand et al. | |
| 6,743,536 B2 | 6/2004 | Fuglevand | |
| 6,745,799 B1 | 6/2004 | Fuglevand | |
| 6,773,839 B2 | 8/2004 | Fuglevand et al. | |
| 6,805,987 B2 | 10/2004 | Bai et al. | |
| 6,806,678 B2 | 10/2004 | Holmes | |
| 6,811,906 B2 | 11/2004 | Bai et al. | |
| 6,828,050 B2 | 12/2004 | Bai et al. | |
| 6,858,335 B2 | 2/2005 | Schmidt et al. | |
| 6,864,010 B1 * | 3/2005 | McLean | 429/39 |
| 6,939,636 B2 | 9/2005 | Fuglevand et al. | |
| 6,982,129 B1 | 1/2006 | Bai et al. | |
| 7,632,595 B1 * | 12/2009 | Bourgeois et al. | 429/38 |
| 2004/0072049 A1 * | 4/2004 | Becerra et al. | 429/34 |

FOREIGN PATENT DOCUMENTS

| | | |
|---|---|---|
| WO | WO 03/063283 A1 | 7/2003 |

* cited by examiner

FUEL CELL STACK WITH A PLURALITY OF CONNECTED SINGLE UNIT FUEL CELLS

CROSS REFERENCE TO RELATED APPLICATIONS

The present application claims priority to U.S. Provisional Patent Application Ser. No. 60/705,600 filed on Aug. 3, 2005, entitled "Solid State Microelectronic Fuel Cell System", U.S. Provisional Patent Application Ser. No. 60/715,697 filed on Sep. 8, 2005, entitled "Fuel Cell Implementation in Circuit Board", and U.S. Provisional Patent Application Ser. No. 60/756,442 filed on Jan. 4, 2006, entitled "Fuel Cell Implementation in Multi-Layer Circuit Board", all of which are incorporated herein by reference.

FIELD

The present embodiments relate generally to a fuel cell stack for housing a plurality of connected single unit fuel cells that include a membrane electrode assembly for enabling gases to flow in three dimensions for providing increased power.

BACKGROUND

Many of the fuel cell stacks on the current market include individual fuel cells that are capable of a linear two dimensional, serpentine gas flow on or through the anode and/or the cathode of the fuel cell.

A need exists for an improved fuel cell stack that possesses the capabilities of providing a high level of power and a quick ramp-up time for achieving full power.

A need exists for a fuel cell stack that can be manufactured using an inexpensive high volume manufacturing process.

The present embodiments meet these needs.

SUMMARY

The present embodiments generally relate to a fuel cell stack for housing a plurality of connected fuel cells, fuel cell connectors, load connectors, a fuel manifold, an oxidant manifold, and a controller for producing a high level of power.

The embodiments of the fuel cell stack include a plurality of connected fuel cells, in which each fuel cell includes a membrane electrode assembly (MEA) with a proton exchange membrane (PEM) disposed between a first carbon base and a second carbon base. In an embodiment, the carbon base can be a porous carbon material, such as a graphite, a woven carbon cloth, or a non-woven carbon felt, that enables gas diffusion within the fuel cell.

The first carbon base has an anode side formed from between 0.1 milligrams/cm$^2$ and 0.3 milligrams/cm$^2$ of a first catalyst on a side adjacent to the proton exchange membrane (PEM). The second carbon base has a cathode side formed from between 0.3 milligrams/cm$^2$ and 0.6 milligrams/cm$^2$ of a second catalyst on a side adjacent to the proton exchange membrane (PEM). A gasket can be disposed around an edge of the proton exchange membrane for sealing the sides of the proton exchange membrane without covering the anode side or the cathode side.

Each fuel cell can include a membrane electrode assembly that includes a first metalized collector deployed on the anode side of the proton exchange membrane and a second metalized collector deployed on the cathode side of the proton exchange membrane. Each metalized collector is shaped with a body, a projection, and a plurality of paths formed through each body of each metalized collector for enabling diffusion of gases. The first metalized collector can be disposed adjacent to the first carbon base and can be in communication with the first carbon base and the proton exchange membrane, and the second metalized collector can be disposed adjacent to the second carbon base and can be in communication with the second carbon base and the proton exchange membrane, for forming the membrane electrode assembly.

In an embodiment, at least one metalized collector includes a temperature sensor, a voltage sensor, and a current sensor disposed on the projection of the metalized collector. In another embodiment, at least one metalized collector can include a pressure sensor disposed in the body of the metalized collector. A processor with a memory having computer instructions and a database storage can be disposed on a projection of the metalized collector in communication with the sensors. The computer instructions can instruct the processor to monitor and regulate a temperature, a voltage, a current, a humidity, a pressure, a gas flow, and combinations thereof, based on preset limits, which are stored in the database storage and memory. A power supply in communication with the processor can provide the power for starting up the fuel cell stack.

A flexible fuel plenum can be disposed on a side of the membrane electrode assembly of each fuel cell of the fuel cell stack, and a flexible oxidant plenum can be disposed on an opposite side of the membrane electrode assembly for forming an intermediate structure within the fuel cell. In an embodiment, the intermediate structure can be disposed between a fuel manifold and an oxidant manifold for enabling the anode side of the fuel cell to communicate with the fuel manifold and the cathode side of the fuel cell to communicate with the oxidant manifold.

Each flexible plenum can include a top central portion and a bottom central portion, and each central portion can include a plurality of holes for transmitting a gas to each metalized collector. The top central portion and the bottom central portion can include a plurality of nibs for increasing turbulence in gases flowing over the top central portion and the bottom central portion of each flexible plenum. The plurality of nibs can increase communication between the first metalized collector and the first carbon base on the anode side and the second metalized collector and the second carbon base on the cathode side of the proton exchange membrane.

Each flexible plenum has a frame that surrounds the top central portion and the bottom central portion of the flexible plenum. The frame can have a height equivalent to a portion of the plurality of nibs. The frames are adapted to form a seal when engaging another fuel cell.

The frame provides a gas inlet passageway and a gas exhaust passageway for the flow of the gases. Fuel flows over the flexible fuel plenum to the first metalized collector, and oxidant flows over the flexible oxidant plenum to the second metalized collector.

A connector can engage the projections of the first metalized collector and the second metalized collector and form an electrical circuit for operating the fuel cell. This electrical circuit can provide a power removal circuit for facilitating removal of created power from the fuel cell.

The embodiments of the fuel cell include a sealable two-part housing for supporting an oxidant manifold positioned opposite a fuel manifold for supporting and compressing the flexible plenums to the membrane electrode assembly to provide communication between the plurality of nibs and the first metalized collector on the anode side and the plurality of nibs and the second metalized collector on the cathode side.

The two-part housing further includes: a fuel entry port with a fuel channel in communication with the fuel manifold, an oxidant entry port in communication with an oxidant channel in communication with the oxidant manifold, a fuel exhaust port in communication with the flexible fuel plenum, and an oxidant exhaust port in communication with the flexible oxidant plenum.

The intermediate structure, that is formed from the flexible fuel plenum and the flexible oxidant plenum disposed on opposite sides of the membrane electrode assembly, is disposed between the oxidant manifold and the fuel manifold to enable the anode side to communicate with the fuel manifold and the cathode side to communicate with the oxidant manifold.

The fuel cell stack includes a fuel cell connector for connecting in series an anode from one fuel cell with a cathode from an adjacent fuel cell or connecting in parallel a cathode from a first fuel cell in the fuel cell stack with a cathode from an adjacent fuel cell in the fuel cell stack to form a plurality of connected fuel cells.

In an embodiment, an anode load connector can be used to connect an unconnected anode of the fuel cell stack to a load, and a cathode load connector can be used to connect an unconnected cathode of the fuel cell stack to a load.

The embodiments of the fuel cell stack include at least one fuel intake in communication with a fuel source for providing fuel into the fuel cell stack. The embodiments of the fuel cell stack include at least one oxidant intake in communication with an oxidant source for providing oxidant into the fuel cell stack.

The embodiments of the fuel cell stack include a fuel manifold for engaging the at least one fuel intake and providing a sealing engagement with the plurality of connected fuel cells in the housing. The embodiments of the fuel cell stack include a oxidant manifold engaging the at least one oxidant intake and providing a sealing engagement with the plurality of connected fuel cells in the housing The fuel cell stack includes a controller with a processor that is in communication with the fuel intake for monitoring and regulating fuel into the fuel stack. The controller communicates with the oxidant intake for monitoring and regulating oxidant flow into the fuel cell stack. The embodiments permit the controller to monitor the gas inlet passageway and the gas exhaust passageway from the fuel cell stack.

BRIEF DESCRIPTION OF THE DRAWINGS

The detailed description will be better understood in conjunction with the accompanying drawings as follows.

Figure 1A:
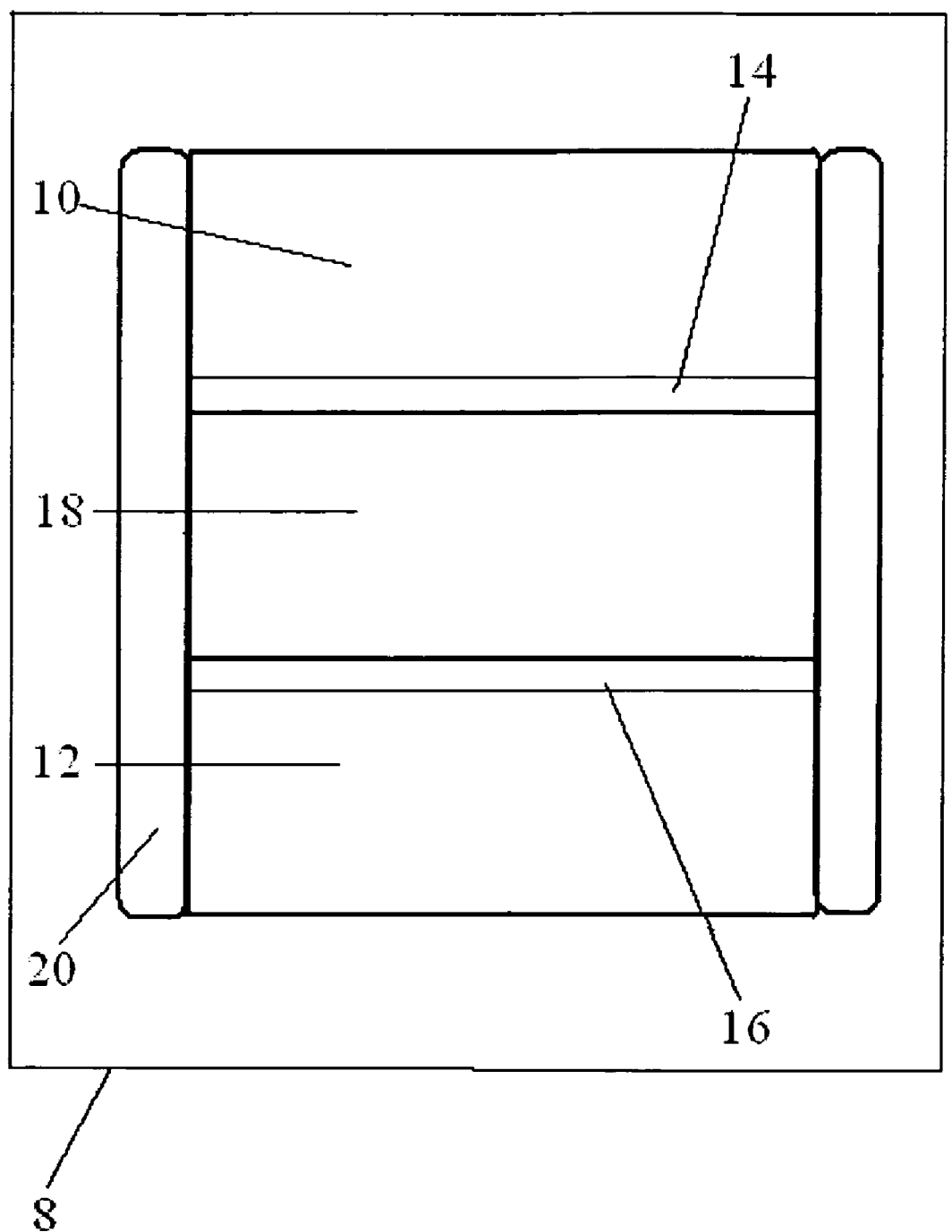
FIG. 1a depicts a cross sectional view of a membrane electrode assembly (MEA) for use in an embodiment of a fuel cell.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Various embodiments of the present invention are based on various geometries. Some embodiments comprise an integrated micro-electromechanical circuit board, that integrates into modularly replaceable fuel cells that can be of different voltages, and that can be plugged or unplugged from the system while the system is operating. An embodiment further contemplates that an indicator light can be used to indicate whether a fuel cell is operating normally or malfunctioning.

Some fuel cell stack designs and implementations reveal a mechanical system approach, with emphasis on framework supporting a macro level implementation of the catalytic fuel reaction surface coupled with a large membrane for proton/electron separation. For each fuel cell of the fuel cell stack, the surface area of the catalyst and the surface area of the proton exchange membrane (PEM) are two gross parameters that are roughly controlled to provide the base parameters for the functioning of the fuel cell. In addition, fuel flow rate, reaction gas flow rate, cell temperature, and electrical load are all parameters controlled to utilize the fuel cell.

In an embodiment, the flow of electrons in an external circuit mirrors the flow of protons across the proton exchange membrane (PEM) to produce proton/electron pair recombination with oxygen to make water.

Some embodiments of the fuel cells forming the fuel cell stacks provide hydrogen ions (H+) to produce proton flow across a proton permeable, electrically insulating, perfluorosulphonic acid based hydrophilic membrane.

The present embodiments relate generally to a fuel cell stack for housing a plurality of single unit fuel cells, in which each single unit fuel cell permits gases to flow in three dimensions, rather than in 2 dimensions through the fuel cell. A fuel cell with a linear two-dimensional flow of gases over a limited surface area of the membrane electrode assembly can be slow and inefficient in producing power. The present embodiments include a fuel cell stack in which each fuel cell permits gases to flow through the paths in a metalized collector, and to flood the membrane electrode assembly (MEA) enabling approximately 99% of the proton exchange membrane of the membrane electrode assembly (MEA) to be used, rather than just going across the membrane electrode assembly (MEA). The embodiments of the fuel cell allow in excess of 50% of the gas diffusion to be utilized. This flow of gases in three dimensions and using 99% of the proton exchange membrane of the membrane electrode assembly allows for a greater amount of power (Amps) to be produced per square inch of proton exchange membrane (PEM) and permits a quick ramp-up time to achieve full power.

Another benefit of the fuel cell stack for holding multiple single unit fuel cells is the ability to produce unit fuel cells at an inexpensive cost because of the efficient use of the membrane electrode assembly and the ability to mass manufacture metalized collectors using an inexpensive high volume metalizing technique and a fast and efficient laser drilling to create the paths in the collectors.

The present embodiments generally relate to a fuel cell stack for housing a plurality of connected single unit fuel cells. Each fuel cell includes a membrane electrode assembly (MEA) with a proton exchange membrane (PEM) disposed between a first carbon base and a second carbon base. In an embodiment, each carbon base can be a porous carbon material, such as a graphite, a woven carbon cloth, or a non-woven carbon felt, that enables gas diffusion within the fuel cell.

The first carbon base has an anode side formed from between 0.1 milligrams/cm$^2$ and 0.3 milligrams/cm$^2$ of a first catalyst on a side adjacent to the proton exchange membrane (PEM). The second carbon base has a cathode side formed from between 0.3 milligrams/cm$^2$ and 0.6 milligrams/cm$^2$ of a second catalyst on a side adjacent to the proton exchange membrane (PEM). Each catalyst can be made of a platinum catalyst, a ruthenium catalyst, and combinations thereof. For example, a proton exchange membrane can have an anode side with 0.3 milligrams/cm$^2$ of a platinum catalyst and/or platinum/ruthenium mixed catalyst and a cathode side with 0.3 milligrams/cm$^2$ of a platinum catalyst.

In an embodiment, the first catalyst and the second catalyst of the fuel cell can be deposited in strips, in which the strips can vary in width or can be the same width. Benefits of the strips include an ability to control electrical conductivity, to control location of reaction sites within the fuel cell, and to control heat flow/thermodynamic characteristics of the fuel cell. The catalyst strips can vary in length and thickness. The catalyst strips can be grouped to each other, or the catalyst strips can be an equal distance apart or varying distances apart from each other. In an embodiment, the first catalyst and the second catalyst can be the same catalyst.

The embodiments include fuel cells having a proton exchange membrane. An example of a proton exchange membrane can include: from 8% up to about 11% by weight of a perfluorosulfonic acid resin, from 2% up to about 3% by weight of a silicotungstic acid, from 12% up to about 15% by weight of a de-ionized water, and the remainder percentage of the proton exchange membrane can be an isopropyl alcohol.

Examples of a proton exchange membrane can be NAFION® made by DuPont™, or other proton exchange membranes (PEM) made by Hoku Scientific, Incorporated of Honolulu, Hi., or 3M of St. Paul Minn. Other usable proton exchange membranes include the proton exchange membranes made by BCS Technologies, Incorporated.

To form a membrane electrode assembly (MEA), a gasket can be disposed around an edge of the proton exchange membrane of the fuel cell for sealing the sides of the proton exchange membrane without covering the anode or the cathode of the fuel cell. The gasket can be between 3 millimeters and 5 millimeters in width. The gasket can be flexible, optionally adhesive, water resistant, gas resistant, and able to withstand extremes in temperature without becoming brittle or cracking. The gasket can be about 0.017 inches or about 0.432 millimeters (mm) in thickness. As an example, the gasket can be made from a polytetrafluoroethylene (PTFE) copolymer or a similar durable material, such as double stick PTFE tape, and can be 3 millimeters in width and 0.432 millimeters in thickness. The polytetrafluoroethylene can be made by DuPont of Wilmington or 3M of Minnesota.

The fuel cell of the fuel cell stack can include a first metalized collector deployed on the anode side of the proton exchange membrane and a second metalized collector deployed on the cathode side of the proton exchange membrane of the fuel cell. Each metalized collector is shaped with a body, a projection, and a plurality of paths formed through each body for enabling diffusion of gases. Further, the first metalized collector can be deployed adjacent to the first carbon base, such that the first metalized collector can be in communication with the first carbon base and the proton exchange membrane. The second metalized collector can be deployed adjacent to the second carbon base, such that the second metalized collector can be in communication with the second carbon base and the proton exchange membrane.

In an embodiment, the plurality of paths in the metalized collector can cover between 40% and 60% of the metalized collector and can vary. Pathways in the metalized collector can be formed by laser drilling or can be mechanically drilled. The shape of the drilled paths can vary and can include: round, square, trapezoidal, and combinations thereof, or other shapes. The paths in the metalized collector are for creating a "flood plane" for the gases. Creating a flood plane for the gases permits free flow of the gases while maintaining structural strength. In an embodiment, a metalized collector can be 6 inches in length by 6 inches in width by 4 inches in thickness with over 5,000 paths drilled into the metalized collector.

In an embodiment, at least one metalized collector can include a temperature sensor, a voltage sensor, and a current sensor disposed on the projection of the metalized collector. An example of a temperature sensor can be a thermocouple or a thermistor, such as those provided by Omega of the United States. An example of a current sensor can be a Hall Effect sensor.

In an embodiment, the metalized collector can include a pressure sensor disposed in the body of the metalized collector and in communication with a processor on the metalized collector. An Omega pressure transducer can be an example of a pressure sensor usable with the microprocessor defined herein. In another embodiment, additional sensors can be embedded in the metalized collector using etching or masking.

The metalized collector can have one layer of metal coating which can be between 1 micro-inch and 2 micro-inches of an inert metal capable of resistance to degradation in the presence of a strong acid. The one layer of metal coating on the metalized collector can be made of gold, a gold alloy, and combinations thereof, that are deposited on at least a portion of the metalized collector.

The embodiments include a fuel cell with a metalized collector that further includes a processor with a memory having computer instructions and a database storage. The metalized collector processor, memory and database storage can be disposed on a projection of the metalized collector in communication with the sensors of the metalized collector. The computer instructions can instruct the metalized collector processor to monitor and regulate temperature, voltage, pressure, current, humidity, gas flow, and combinations thereof, based on comparisons to preset limits, which are stored in the database storage and memory. As an example, a Motorola chip can be used as a microprocessor.

As an example of regulating temperature based on preset limits, computer instructions can be used to instruct the processor to obtain temperature data from the temperature sensor located on the metalized collector and to compare the temperature data to the preset limits for temperature in order to properly regulate the temperature of the fuel cells in the fuel cell stack.

In one embodiment, the sensors and metalized collector processor can be soldered onto the metalized collector. A power supply in communication with the metalized collector processor provides the power for starting up the fuel cell. An example of a power supply would be a 12 volt DC power supply made by Royal Philips Electronics or Siemens for supplying start-up power to the processor.

A flexible fuel plenum can be disposed on a side of the membrane electrode assembly of the fuel cell, and a flexible oxidant plenum can be disposed on an opposite side of the membrane electrode assembly for forming an intermediate structure within the fuel cell.

In one embodiment, the flexible plenum is a substantially non-porous one-piece bilaterally symmetrical material. The flexible plenums can have a thickness of between 0.062 inches and 0.125 inches. Each flexible plenum can include a top central portion and a bottom central portion, and each central portion can include a plurality of holes for transmitting a gas to at least one metalized collector. The top central portion and the bottom central portion can include a plurality of nibs for increasing turbulence in gases flowing over the top central portion and the bottom central portion of each flexible plenum. The plurality of nibs can enhance or increase communication between the first metalized collector and the first carbon base of the fuel cell and the second metalized collector and the second carbon base of the fuel cell. The plurality of nibs can have a diameter with a range between 0.04 inches and 0.075 inches, and a density of between 25 per square inch and 100 per square inch. As an example for a 6 inch in length by a 6 inch in width by a 4 inch in thickness metalized collector, the flexible plenum can have ¼ inch tall nibs and 1/16 inch short nibs.

The embodiments include a frame, that surrounds the top central portion and the bottom central portion of each flexible plenum. The frame has a height equivalent to a portion of the plurality of nibs. The frame provides a gas inlet passageway, that can have a diameter of about 0.030 inches to about 0.060 inches, and a gas exhaust passageway. Each frame is adapted to form a seal when engaging another fuel cell.

In an embodiment, the gas inlet passageway can be connected to a hydrogen tank for supplying fuel to the fuel cell, such as by using a needle. Alternatively, the needle can be used for connecting the gas inlet passageway to a reformer for supplying fuel to the fuel cell, wherein the reformer converts a hydrogen carrying fuel to hydrogen.

The embodiments can include a fuel cell that includes the forming of an anode side when fuel flows over the flexible fuel plenum to the first metalized collector of the fuel cell, and the forming of a cathode side when oxidant flows over the flexible oxidant plenum to the second metalized collector of the fuel cell.

Each fuel cell of the fuel cell stack can produce a current density of at least 350 milli-Amps (mA) per square centimeter at a nominal voltage of about 0.5 volts. The embodiments of the fuel cell include an electrical output of at least 10.5 watts.

An example of the fuel cell size can be 3 inches in length by 4 inches in width by an ⅛ inch in thickness. Another example of a fuel cell can be 16 inches in length by 10 inches in width by an ⅛th inch in thickness having a voltage of 0.5 volts. A rectangular shape fuel cell is one example of a shape that can be used, or the fuel cell can be cylindrically shaped with the anode side on the inside of the fuel cell, the cathode side on the outside of the fuel cell, and can include hydrogen flowing down the center of the cylindrical shaped fuel cell.

In an embodiment of the fuel cell stack, the plurality of connected fuel cells includes fuel cell connectors for connecting in series an anode from one fuel cell in the plurality of connected fuel cells with a cathode from an adjacent fuel cell in the plurality of connected fuel cells, or connecting in parallel the cathode from one fuel cell in the plurality of connected fuel cells with a cathode from an adjacent fuel cell in the plurality of connected fuel cells. An example of the fuel cell connector is an edge connector for connecting an anode to anode or anode to cathode of individual and adjacent fuel cells. A connector made by Foxconn Electronics, Inc. of California is usable herein. The fuel cell connectors engage the projections of the first metalized collector and the second metalized collector and form an electrical circuit for operating the fuel cell and for providing a power removal circuit for facilitating removal of created power from the fuel cell.

In an embodiment, an anode load connector can be used for connecting an unconnected anode of the fuel cell stack to a load. An example of an anode load connector is a coated wire connected to an anode of a single unit fuel cell housed within a fuel cell stack to a load, such as a television.

A cathode load connector can be used for connecting an unconnected cathode of the fuel cell stack to a load. An example of a cathode load connector is a coated wire to connect a cathode of a single unit fuel cell housed within a fuel cell stack to a load, such as a television.

The embodiments of the fuel cell stack include a sealable two-part housing for supporting a plurality of fuel cells, connectors, and manifolds. The housing can further include: at least one fuel intake in communication with a fuel source for providing fuel into the plurality of connected fuel cells in the fuel cell stack, at least one fuel exhaust for releasing fuel exhaust gases from the plurality of connected fuel cells, at least one oxidant intake in communication with an oxidant source for providing oxidant into the plurality of connected fuel cells, and at least one oxidant exhaust for releasing oxidant exhaust gases from the plurality of connected fuel cells. A fuel intake usable in the fuel cell stack can have a diameter of about 1/16 inches to about 1/32 inches. An oxidant intake usable in the fuel cell stack can have a diameter of about 1/16 inches to about 1/32 inches.

In an embodiment, the housing can be a sealable two-part metal housing for supporting the oxidant manifold positioned opposite the fuel manifold and for supporting and the assembled and connected, in series or parallel, fuel cells. In an embodiment, the sealable two-part housing can cover the plurality of connected fuel cells and manifolds enabling fuel to enter a fuel entry port or fuel intake port and progress through a fuel channel to a fuel manifold. Fuel then floods across a side of the flexible plenum to a fuel exhaust in the fuel manifold. Similarly, oxidant floods the flexible oxidant plenum, located opposite the flexible fuel plenum, by entering an oxidant entry port or oxidant intake port and progressing through the oxidant channel to the oxidant manifold, and then to an oxidant exhaust in the oxidant manifold, for forming a working fuel cell.

The embodiments of the fuel cell stack include a fuel manifold for engaging the at least one fuel intake and an oxidant manifold for engaging the at least one oxidant intake. In an embodiment, the fuel manifold and the oxidant manifold can have wedge shapes, with passageways drilled through the bodies to permit fuel or oxidant to flow into the connected fuel cells. Each manifold provides a sealing engagement with the assembled single unit fuel cells and the housing For example, a housing can be 6 inches in length and 4 inches in width and hold 4 connected single unit fuel cells. The fuel manifold and oxidant manifold would be 6 inches in length, 1 inch in width, and 1 inch in thickness having a pyramid shape for engaging the fuel intake and providing a sealing engagement for the plurality of connected fuel cells in the housing.

The embodiments of the fuel cell stack can include a controller with a processor in communication with the fuel intake for monitoring and regulating fuel into the entire fuel cell stack. The controller can be in communication with the oxidant intake of the housing for monitoring and regulating oxidant flow into the fuel stack.

With regard to the Figures, FIG. 1a depicts a cross sectional view of a membrane electrode assembly (8) for use in an embodiment of a fuel cell, that can be included in a fuel cell stack. The membrane electrode assembly (8) includes a proton exchange membrane (18) disposed between a first carbon base (10) and a second carbon base (12). A gasket (20) is disposed around the proton exchange membrane (18) for sealing the sides of the proton exchange membrane (18) without covering the anode side or the cathode side.

The first carbon base (10) has an anode side formed from between 0.1 milligrams/cm$^2$ and 0.3 milligrams/cm$^2$ of a first catalyst (14) disposed adjacent to the proton exchange membrane. The second carbon base (12) has a cathode side formed from between 0.3 milligrams/cm$^2$ and 0.6 milligrams/cm$^2$ of a second catalyst (16) disposed adjacent to the proton exchange membrane. Each catalyst can be made of a platinum catalyst, a ruthenium catalyst, and combinations thereof.

Figure 1B:
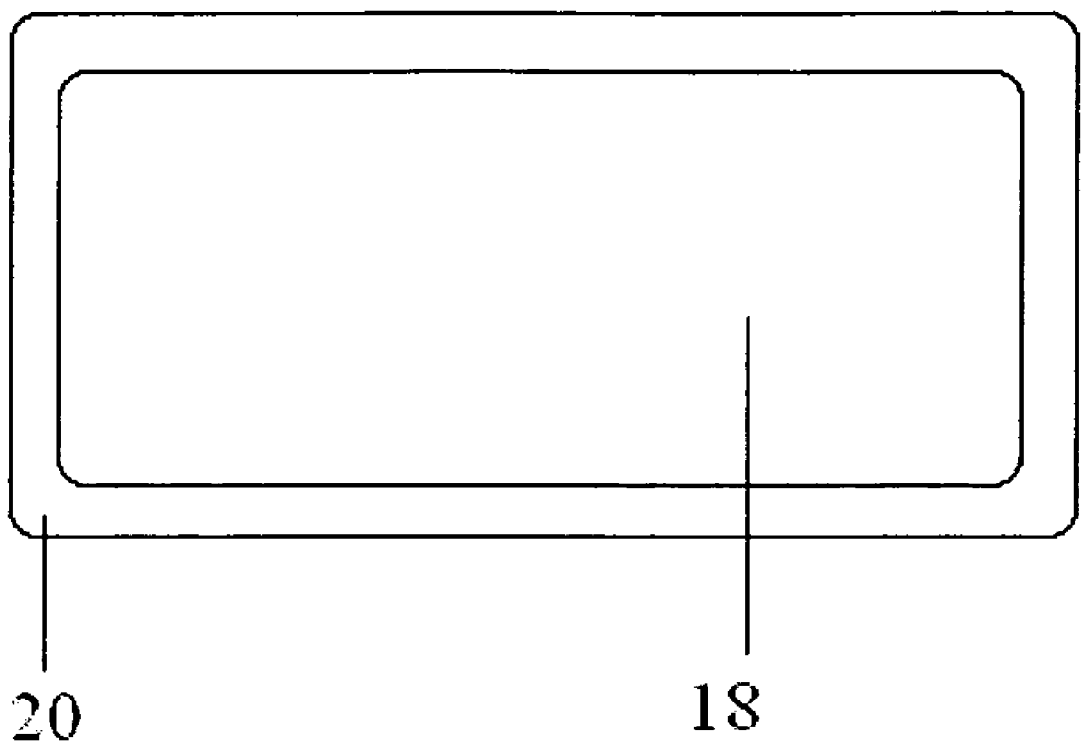
FIG. 1b depicts a top view of a gasket surrounding the anode side of a proton exchange membrane usable in an embodiment of a fuel cell.

FIG. 1b depicts a top view of a gasket (20) surrounding the anode side of a proton exchange membrane (18) usable in an embodiment of a fuel cell.

Figure 2:
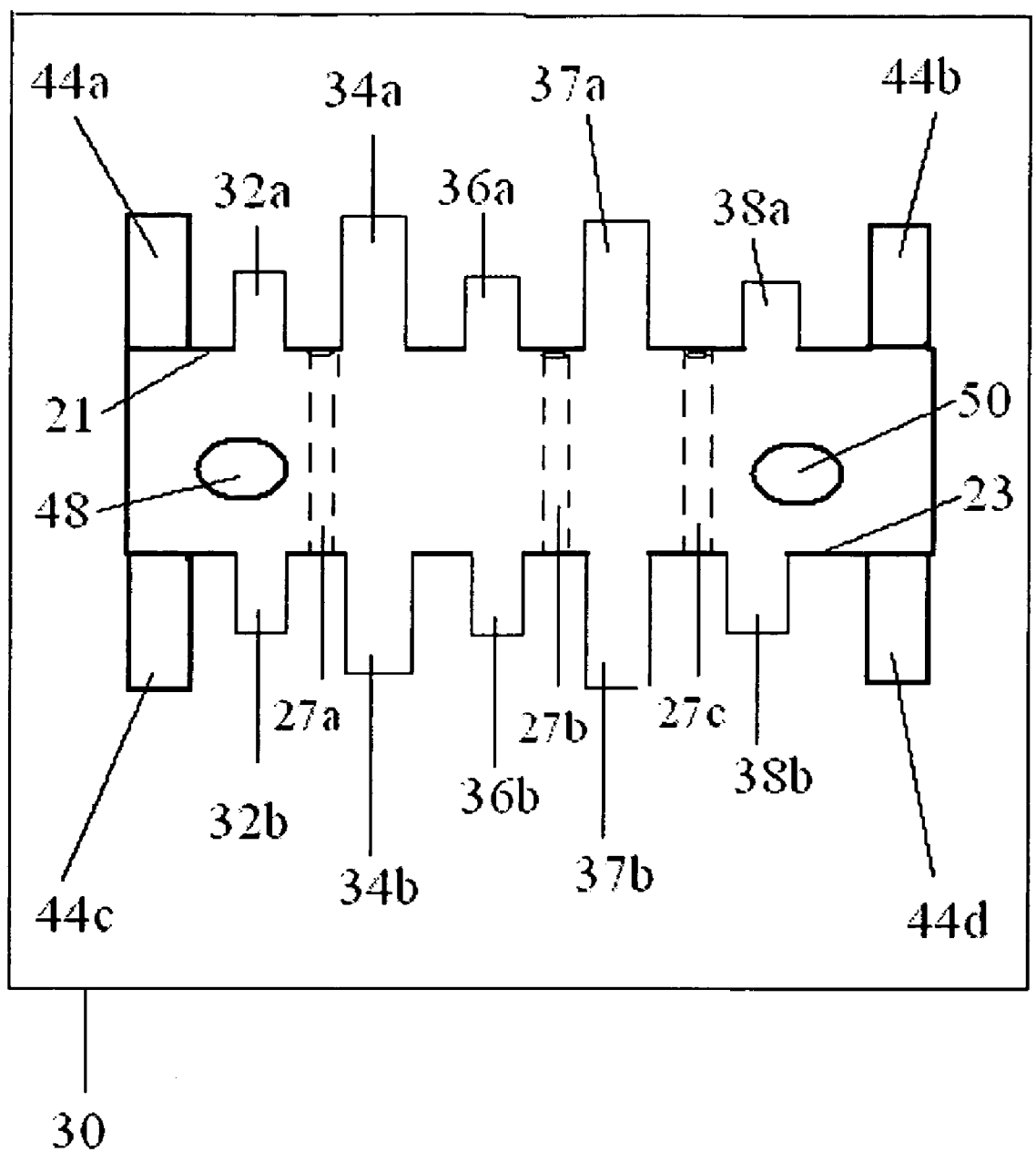
FIG. 2 depicts a cross sectional view of a flexible plenum for use in an embodiment of a fuel cell.

FIG. 2 depicts a side view of a flexible fuel plenum (30) for use in an embodiment of a fuel cell. A flexible fuel plenum (30) can be disposed on a side of the membrane electrode assembly of the fuel cell, and a flexible oxidant plenum (not shown) can be disposed on an opposite side of the membrane electrode assembly for forming an intermediate structure of the fuel cell.

Figure 3:
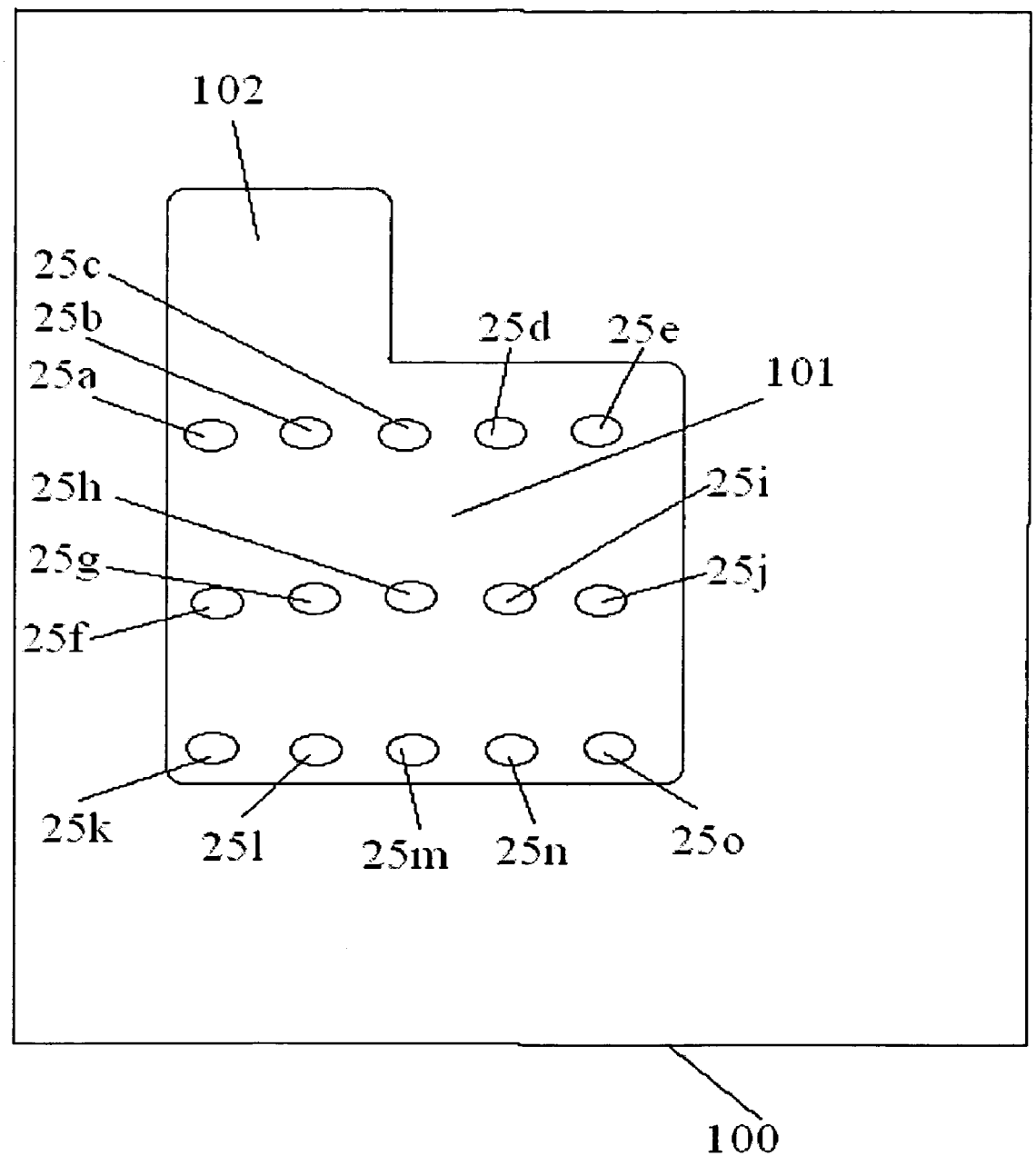
FIG. 3 depicts a top view of a metalized collector for use in an embodiment of a fuel cell.
Figure 4:
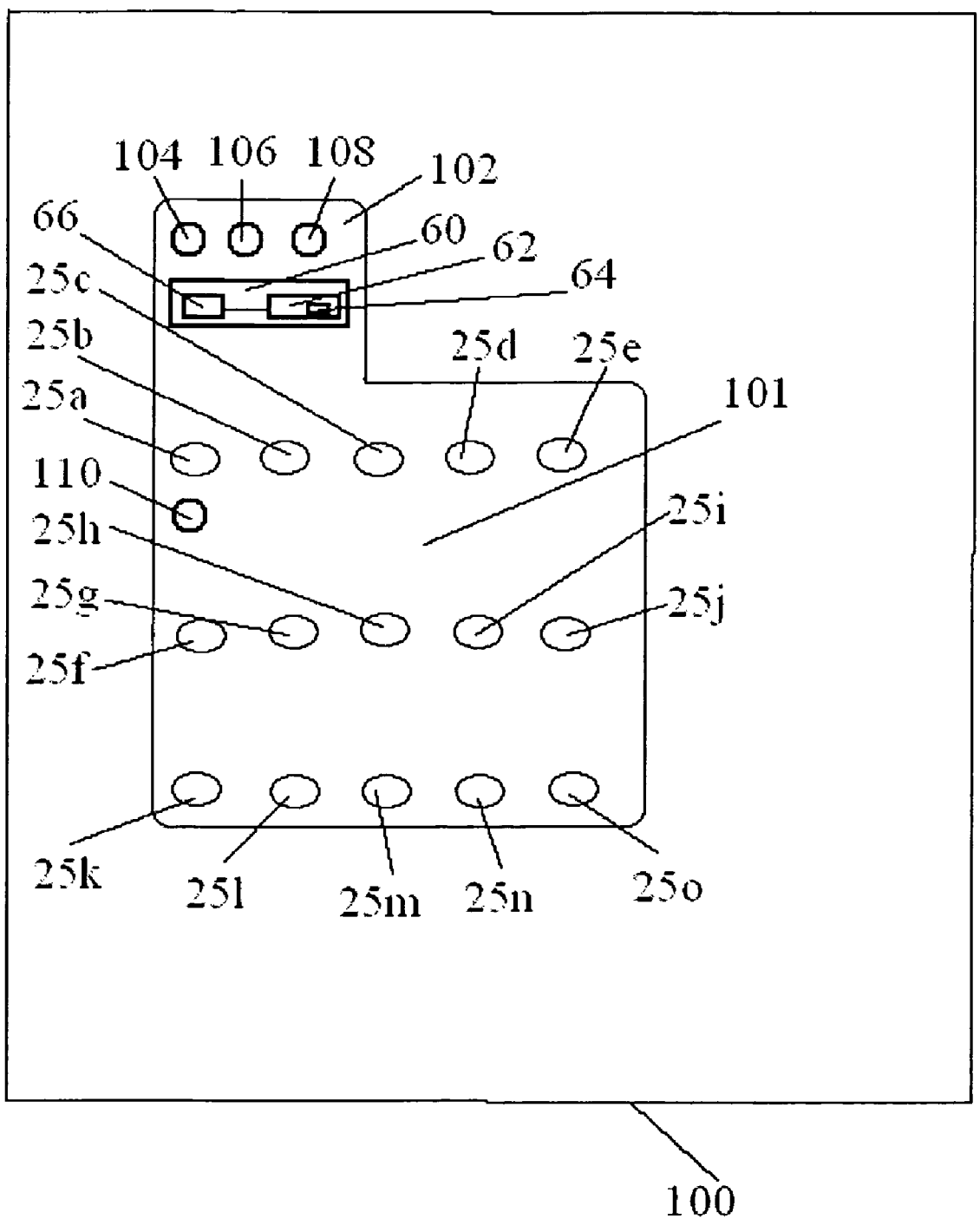
FIG. 4 depicts a top view of a metalized collector with sensors and a processor attached for use in an embodiment of a fuel cell.
Figure 8:
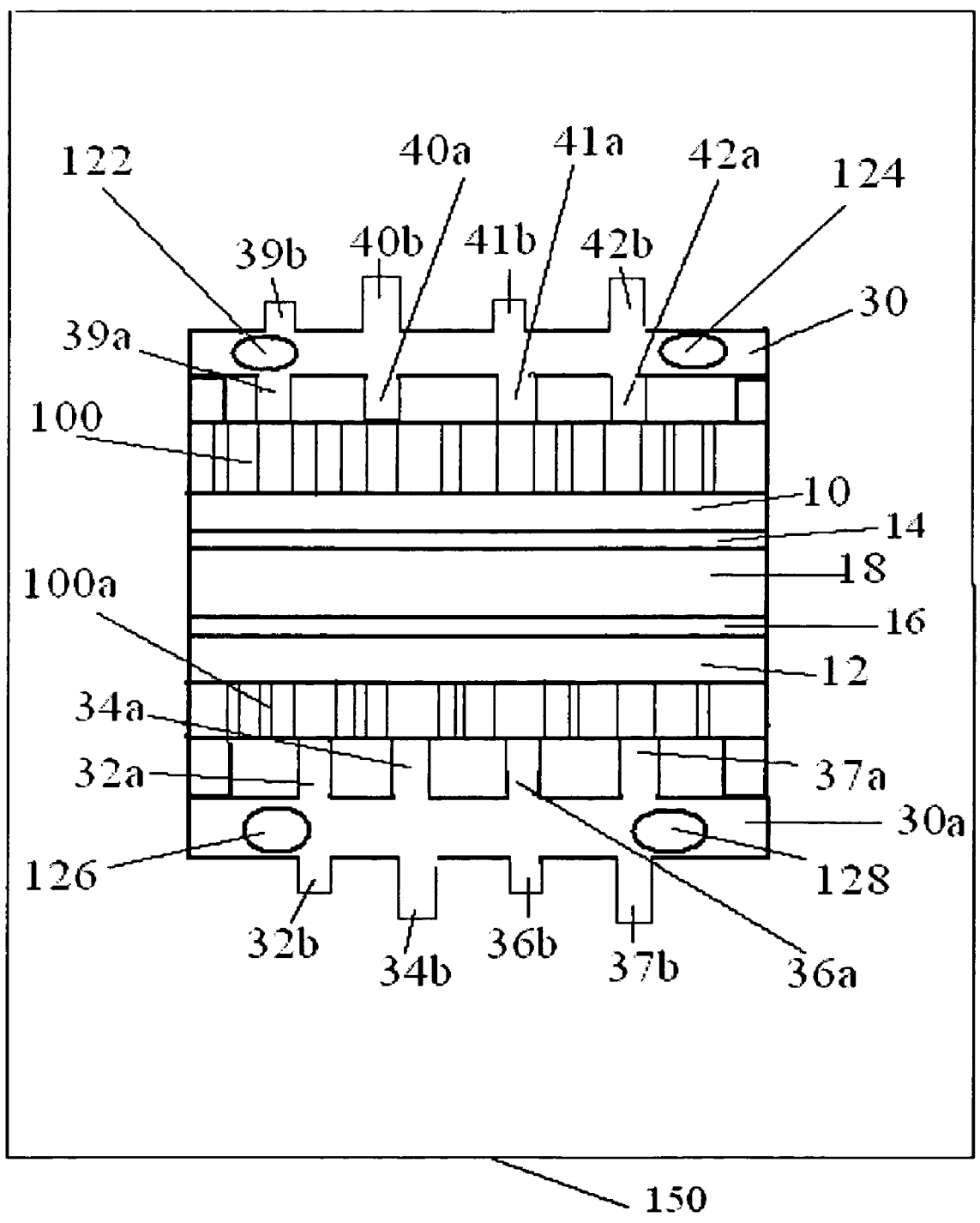
FIG. 8 depicts a cross sectional view of an embodiment of a single unit fuel cell.

Each flexible plenum can include a top central portion (21) and a bottom central portion (23), and each central portion can include a plurality of holes for transmitting a gas to at least one metalized collector (100 as shown in FIG. 3, FIG. 4, and FIG. 8). The top central portion (21) and the bottom central portion (23) can include a plurality of nibs (32a, 32b, 34a, 34b, 36a, 36b, 37a, 37b, 38a, and 38b) for increasing turbulence in gases flowing over the top central portion (21) and the bottom central portion (23) of each flexible plenum.

The flexible plenum includes a frame (44a, 44b, 44c, and 44d) that surrounds the top central portion (21) and the bottom central portion (23) of each flexible plenum (30) and provides a gas inlet passageway (48) and a gas exhaust passageway (50) for the flow of the gases. The embodiments include the forming of an anode when fuel flows over the flexible fuel plenum to the first metalized collector, and the forming of a cathode when oxidant flows over the flexible oxidant plenum to the second metalized collector. The flexible plenum includes a plurality of holes (27a, 27b, and 27c) that can be in communication with a plurality of paths in a metalized collector for diffusion of gases.

FIG. 3 depicts a top view of a metalized collector (100) for use in an embodiment of a fuel cell. Each metalized collector is shaped with a body (101), a projection (102), and a plurality of paths (25a, 25b, 25c, 25d, 25e, 25f, 25g 25h, 25i, 25j, 25k, 25l, 25m, 25n, and 25o) formed through each body of each metalized collector for enabling gas diffusion into the proton exchange membrane.

FIG. 4 depicts a top view of a metalized collector (100) with sensors attached for use in an embodiment of a fuel cell. The metalized collector (100) can include a temperature sensor (104), a voltage sensor (106), and a current sensor (108) disposed on the projection (102) of the metalized collector (100). Further, the metalized collector (100) can include a pressure sensor (110) that can be disposed on the top central portion or bottom central portion of the body (101) of the metalized collector (100). The metalized collector (100) can include a processor (60) with a memory (62) having computer instructions (64) and a database storage (66), which are all disposed on the projection (102) of the metalized collector (100) and used for communications with the sensors regarding the monitoring and regulating of temperature, voltage, current, pressure, gas flow, and combinations thereof, and can include comparisons to preset limits stored in the database storage (66) and the memory (62) of the processor (60).

Each metalized collector is shaped with a body (101), a projection (102), and a plurality of paths (25a, 25b, 25c, 25d, 25e, 25f, 25g 25h, 25i, 25j, 25k, 25l, 25m, 25n, and 25o) formed through each body of each metalized collector for enabling gas diffusion. The plurality of paths can be located centrally or on the entire body portion of the metalized collector, and the plurality of paths can be in communication with the plurality of holes of a flexible plenum for enabling gas diffusion.

Figure 5:
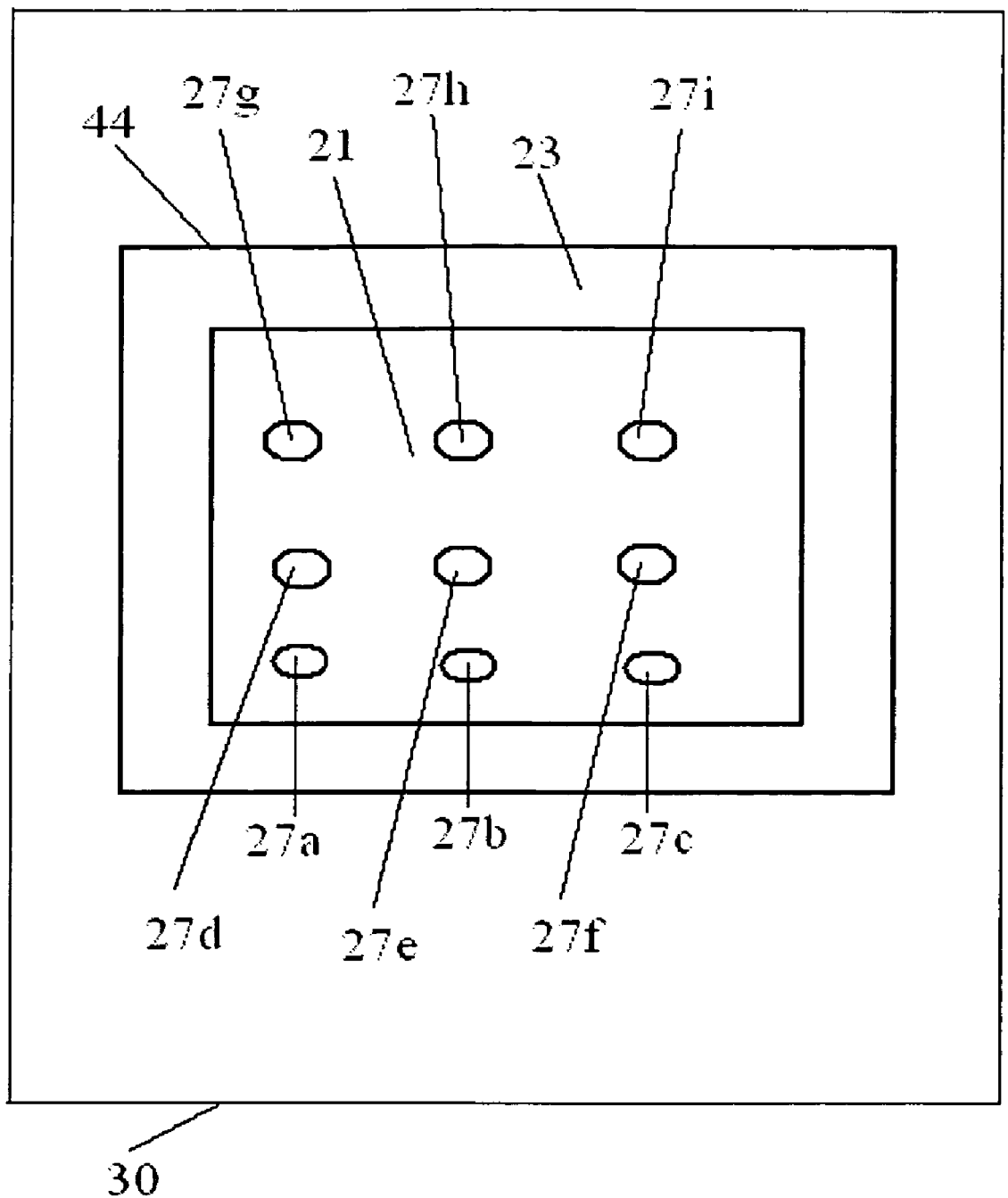
FIG. 5 depicts a top view of a flexible plenum for use in an embodiment of a fuel cell.

FIG. 5 depicts a top view of a flexible plenum for use in an embodiment of a fuel cell. The flexible plenum (30) includes a frame (44), that surrounds the top central portion (21) and the bottom central portion (23) of each flexible plenum (30), and each central portion can include a plurality of holes (27a, 27b, 27c, 27d, 27e, 27f, 27g, 27h, and 27i) for transmitting a gas to at least one metalized collector (100) as shown in FIG. 8.

Figure 6:
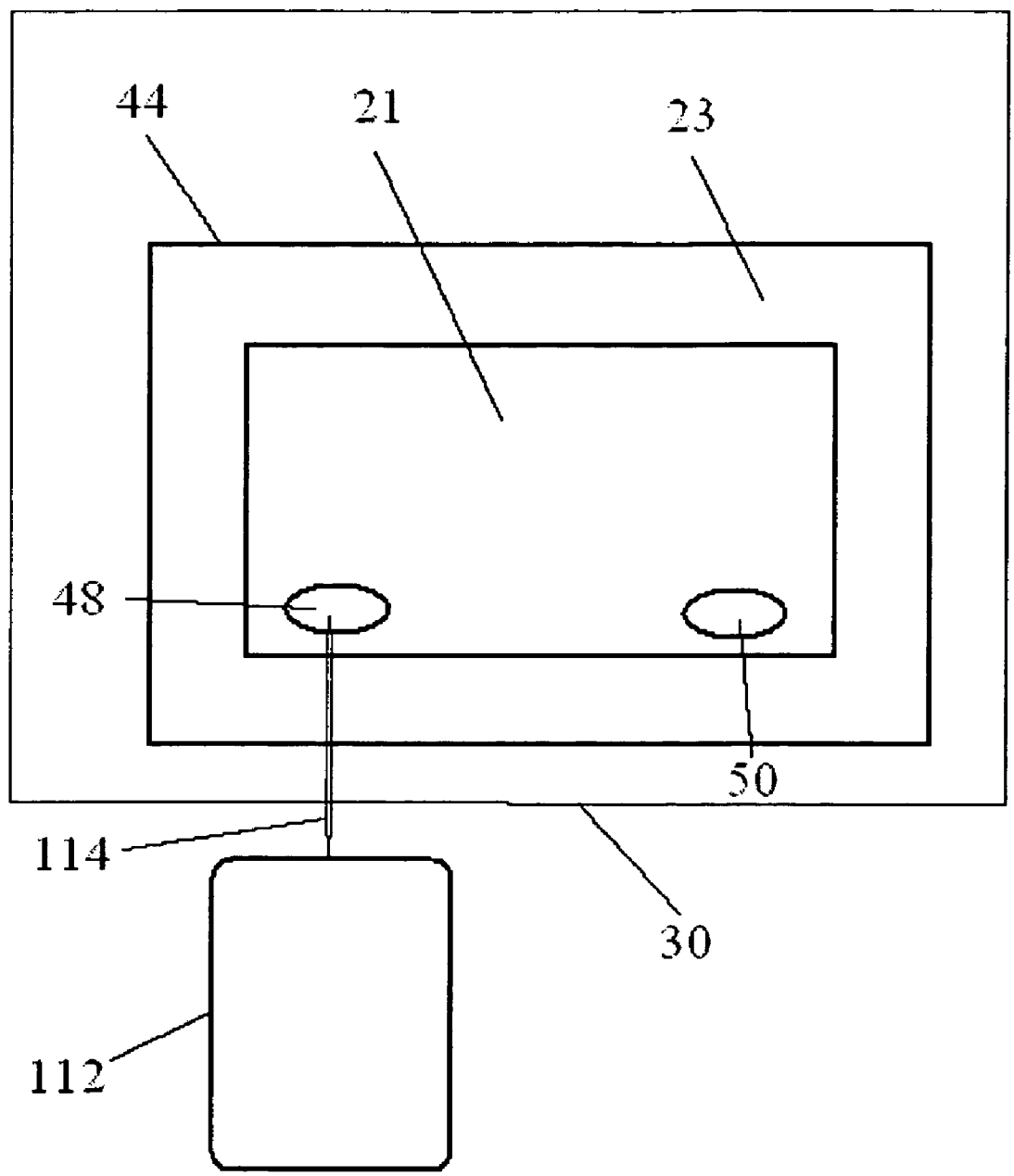
FIG. 6 depicts a top view of a flexible plenum with a needle usable in an embodiment of a fuel cell.

FIG. 6 depicts a top view of a flexible plenum (30) with a needle (114) for use in an embodiment of a fuel cell. The flexible plenum (30) includes a frame (44), that surrounds the top central portion (21) and the bottom central portion (23) of the flexible plenum (30), and provides a gas inlet passageway (48), that can have a diameter of about 0.030 inches to about 0.060 inches, and a gas exhaust passageway (50). The gas inlet passageway (48) can be connected to a hydrogen tank (112) for supplying fuel to the fuel cell, such as by using the needle (114). Alternatively, the needle (114) can be used for connecting the gas inlet passageway (48) to a reformer (not shown) for supplying fuel to the fuel cell. The reformer converts a hydrogen carrying fuel to hydrogen. Examples of hydrogen carrying fuels include ammonia, propane, methane, ethane, butane, and natural gas.

Figure 7:
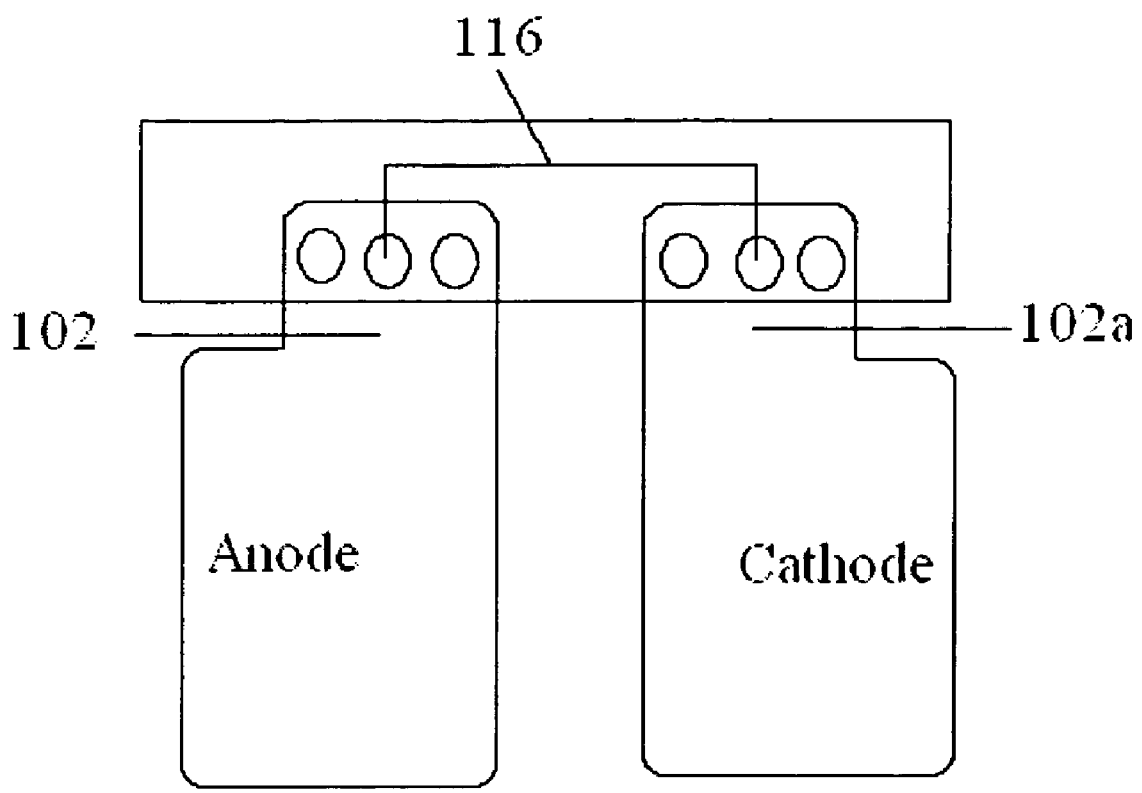
FIG. 7 depicts a top view of a connector for use in an embodiment of a fuel cell.

FIG. 7 depicts a top view of a connector (116) for use in an embodiment of a fuel cell connecting two fuel cells in series where the metalized collectors form the anode sides and the cathode sides. The connector (116) engages the projections (102) of the first metalized collector on the anode side and the projections (102a) of the second metalized collector on the cathode side and forms an electrical circuit for operating the fuel cell and for providing a power removal circuit for facilitating removal of created power from the fuel cell.

FIG. 8 depicts a cross sectional view of an embodiment of a single unit fuel cell (150). The fuel cell includes a membrane electrode assembly with a proton exchange membrane (18) disposed between a first carbon base (10) and a second carbon base (12).

The embodiments of the fuel cell include an anode side formed from between 0.1 milligrams/cm$^2$ and 0.3 milligrams/cm$^2$ of a first catalyst (14) on a side of the first carbon base (10) adjacent to the proton exchange membrane (PEM) (18), and a cathode side formed from between 0.3 milligrams/cm$^2$ and 0.6 milligrams/cm$^2$ of a second catalyst (16) on a side of the second carbon base (12) adjacent to the proton exchange membrane (PEM) (18).

The embodiments of the fuel cell (150) include a first metalized collector (100) deployed on the anode side of the proton exchange membrane and a second metalized collector (100a) deployed on the cathode side of the proton exchange membrane. Each metalized collector is shaped with a body, a projection, and a plurality of paths formed through each body for permitting gas diffusion.

The embodiments include the first metalized collector (100) disposed adjacent to the first carbon base (10) and in communication with the first carbon base (10) and the proton exchange membrane (18), and the second metalized collector (100a) disposed adjacent to the second carbon base (12) and in communication with the second carbon base (12) and the proton exchange membrane (18).

The single unit fuel cell (150) includes a flexible fuel plenum (30) on the anode side of the proton exchange membrane (18) with a plurality of nibs (39a, 40a, 41a, and 42a) on the top central portion and plurality of nibs (39b, 40b, 41b, and 42b) located on the bottom central portion for increasing turbulence in the flow of the gases. The single unit fuel cell (150) includes a flexible oxidant plenum (30a) on the cathode side of the proton exchange membrane (18) with a plurality of nibs (32a, 34a, 36a, and 37a) on the top central portion and plurality of nibs (32b, 34b, 36b, and 37b) located on the bottom central portion for increasing turbulence in the flow of the gases. The plurality of nibs can increase communication between the first metalized collector (100) and the first carbon base (10) on the anode side and the second metalized collector (100a) and the second carbon base (12) on the cathode side.

The embodiments of the fuel cell (150) include a sealable two-part housing for supporting an oxidant manifold positioned opposite a fuel manifold for supporting the membrane electrode assembly and the flexible plenums. The sealable two-part housing supports the flexible fuel plenum and the membrane electrode assembly and includes: a fuel entry port (122) with a fuel channel in communication with the fuel manifold and a fuel exhaust port (124) in communication with the flexible fuel plenum (30). The two-part housing supporting the flexible oxidant plenum (30a) includes: an oxidant entry port (126) in communication with an oxidant channel in communication with the oxidant manifold and an oxidant exhaust port (128) in communication with the flexible oxidant plenum. Further, the sealable two-part housing can compress the flexible plenums to the membrane electrode assembly for providing communication between the plurality of nibs and the metalized collectors of the fuel cells.

The embodiments of the fuel cell enable the forming of an anode when fuel flows over the flexible fuel plenum to the first metalized collector, and the forming of a cathode when oxidant flows over the flexible oxidant plenum to the second metalized collector.

Figure 9:
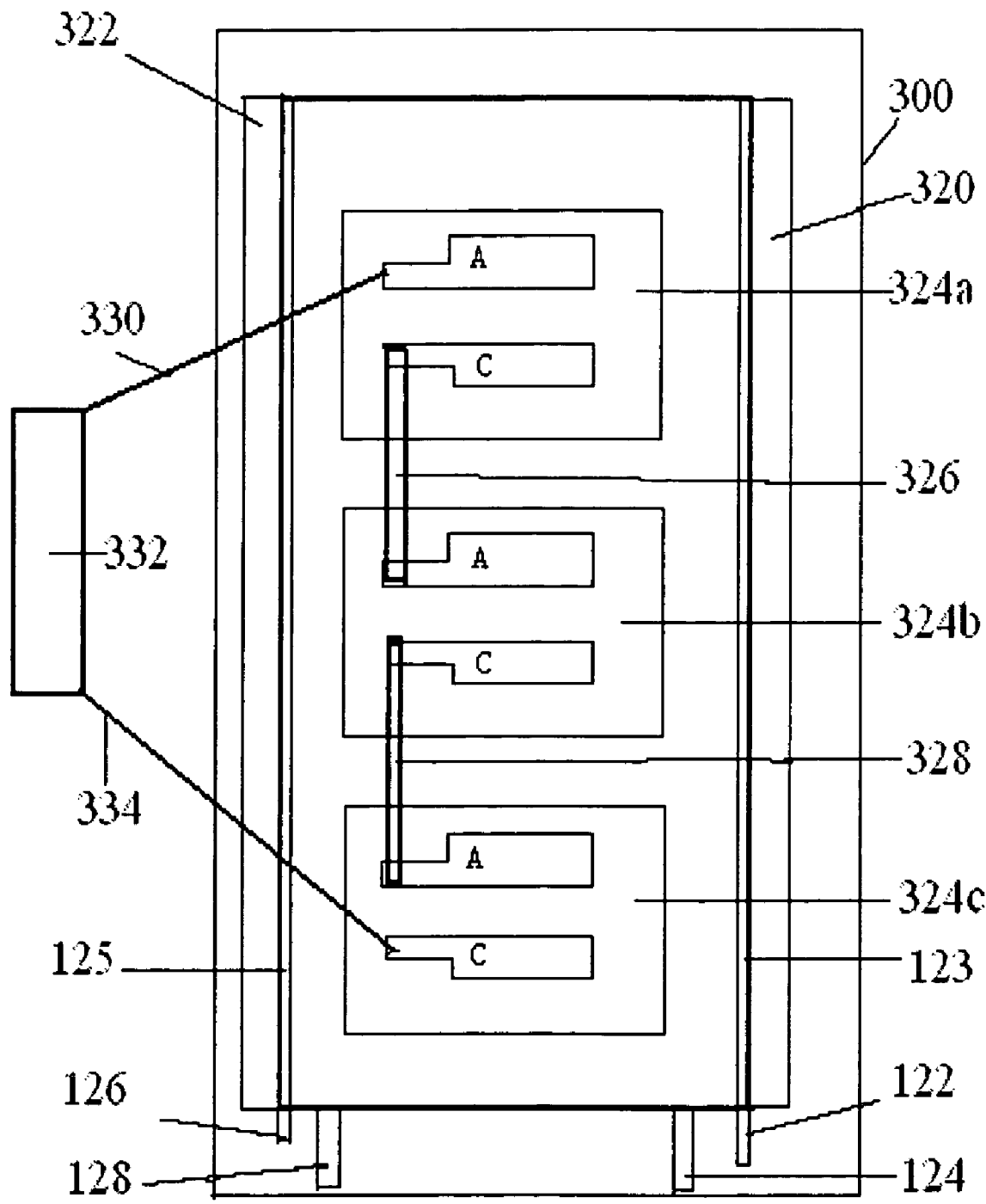
FIG. 9 depicts a side view of an embodiment of a fuel cell stack with fuel cells oriented in series.

FIG. 9 depicts a side view of an embodiment of a fuel cell stack in which three fuel cells are serially connected, cathode to anode. In this embodiment, the fuel cell stack includes a sealable two-part housing (300) for holding three serially connected fuel cells (324a, 324b, 324c). Each fuel cell includes an anode (a) and a cathode (c), such that a first fuel cell connector (326) can be used to connect the cathode of the first fuel cell (324a) with the anode of the second fuel cell (324b), and the second fuel cell connector (328) can be used to connect the cathode of the second fuel cell (324b) with the anode of the third fuel cell (324c).

At least one fuel intake (122) can be in communication with a fuel source for providing a fuel channel (123) with fuel gas to flow into the fuel cells of the fuel cell stack. At least one oxidant intake (126) can be in communication with an oxidant source for providing an oxidant channel (125) with an oxidant gas to flow into the fuel cells of the fuel cell stack. A fuel exhaust port and passageway (124) can be located in the housing for releasing the exhaust gases. An oxidant exhaust port and passageway (128) can be located in the housing for releasing oxidant exhaust gases.

The fuel cell stack includes a fuel manifold (320) for engaging a fuel channel (123) in the sealable two-part housing (300), which engages the fuel intake (122) and for providing a sealing engagement with the plurality of connected fuel cells (324a, 324b, 324c) in the housing (300). An oxidant manifold (322) located on the opposite side of the fuel manifold (320) can engage an oxidant channel (125) in the two-part housing (300), which engages the oxidant intake (126) and can provide a sealing engagement with the plurality of connected fuel cells (324a, 324b, 324c) in the housing (300).

In this embodiment, an anode load connector (330) can be used to connect an unconnected anode of the first fuel cell (324a) of the fuel cell stack to a load (332), such as a computer. A cathode load connector (334) can be used to connect an unconnected cathode of third fuel cell (324c) of the fuel cell stack to the load (332).

Figure 10:
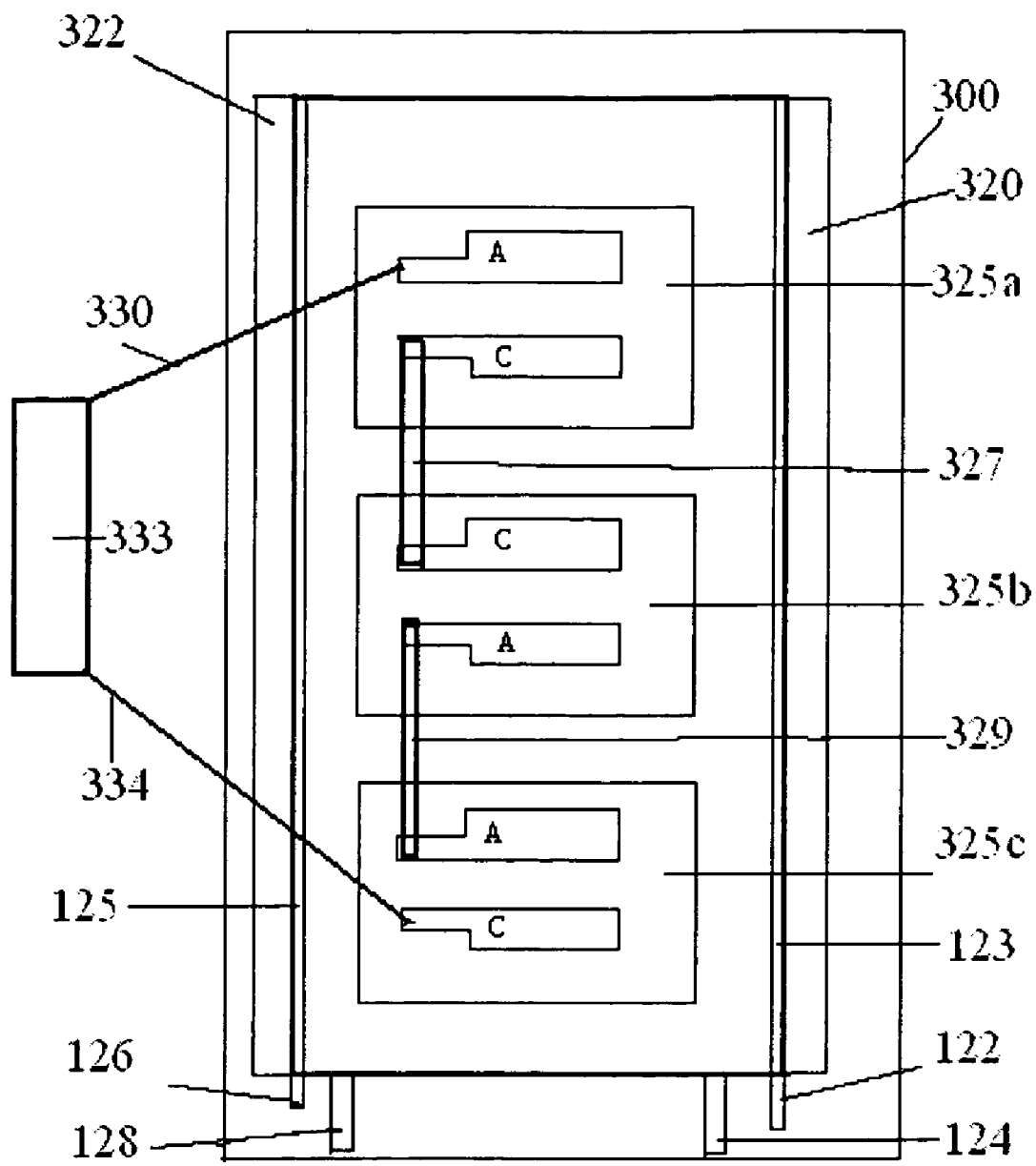
FIG. 10 depicts a side view of an embodiment of a fuel cell stack with fuel cells oriented in parallel.

FIG. 10 depicts a side view of an embodiment of a fuel cell stack in which the fuel cells are connected in parallel. In this embodiment, the fuel cell stack includes a sealable two-part housing (300) for holding three fuel cells (325a, 325b, 325c) connected in parallel. Each fuel cell includes an anode (a) and a cathode (c), such that a first fuel cell connector (327) can be used to connect the cathode of the first fuel cell (325a) with the cathode of the second fuel cell (325b), and the second fuel cell connector (329) can be used to connect the anode of the second fuel cell (325b) with the anode of the third fuel cell (325c).

At least one fuel intake (122) can be in communication with a fuel source for providing a fuel channel (123) with fuel gas to flow into the plurality of connected fuel cells of the fuel cell stack. At least one oxidant intake (126) can be in communication with an oxidant source for providing an oxidant channel (125) with oxidant gas to flow into the plurality of connected fuel cells of the fuel cell stack. A fuel exhaust port and passageway (124) can be located in the housing for releasing the exhaust gases. An oxidant exhaust port and passageway (128) can be located in the housing for releasing oxidant exhaust gases.

The fuel cell stack includes a fuel manifold (320) for engaging a fuel channel (123) in the sealable two-part housing (300), which engages the fuel intake (122) and for providing a sealing engagement with the plurality of connected fuel cells (325a, 325b, 325c) in the housing (300). An oxidant manifold (322) located on the opposite side of the fuel manifold (320) can engage an oxidant channel (125) in the two-part housing (300), which engages the oxidant intake (126) and can provide a sealing engagement with the plurality of connected fuel cells fuel cells (325a, 325b, 325c) in the housing (300).

In this embodiment, an anode load connector (330) can be used to connect an unconnected anode of the first fuel cell (325a) of the fuel cell stack to a load (333), such as a television. A cathode load connector (334) can be used to connect an unconnected cathode of third fuel cell (325c) of the fuel cell stack to the load (333).

Figure 11:
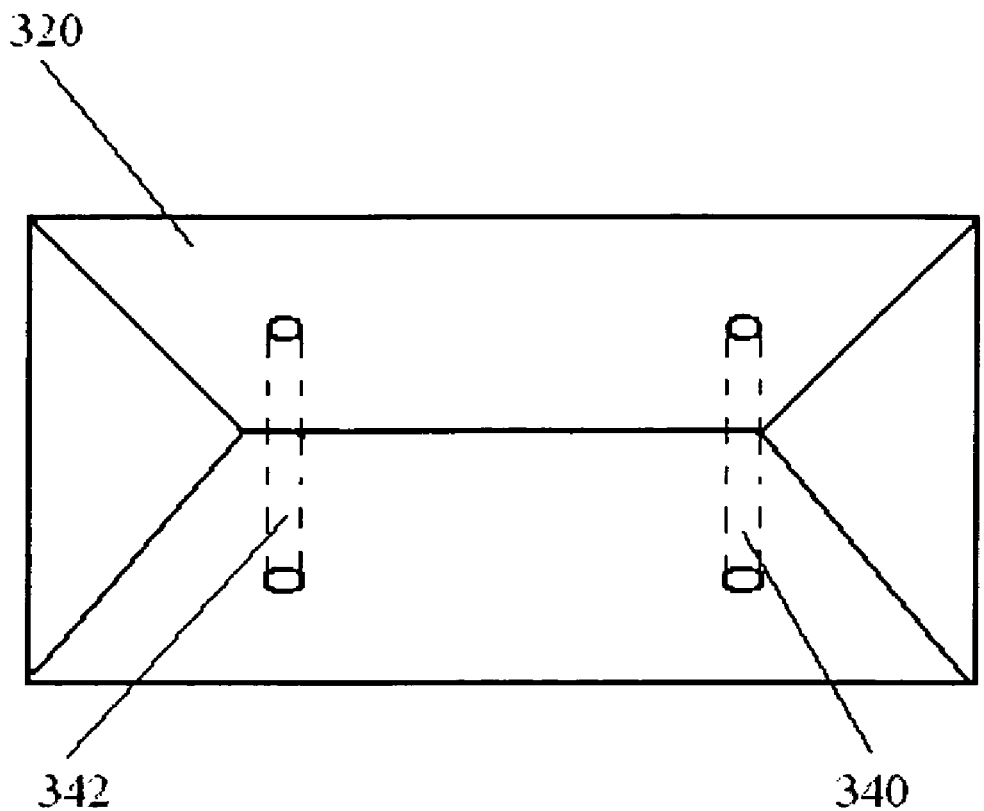
FIG. 11 depicts a wedge-shaped fuel manifold usable in an embodiment of a fuel cell stack.

FIG. 11 depicts a cross sectional view of a wedge-shaped fuel manifold (320) usable in an embodiment of a fuel cell stack. The wedge has two-ports (340 and 342) for communication between the fuel cell stack and the fuel intake (122 shown in FIGS. 9 and 10) and the fuel exhaust (124 shown in FIGS. 9 and 10) of the two-part housing. The oxidant has the same configuration for communication between the oxidant intake (126 shown in FIGS. 9 and 10) and the oxidant exhaust (128 shown in FIGS. 9 and 10).

Figure 12:
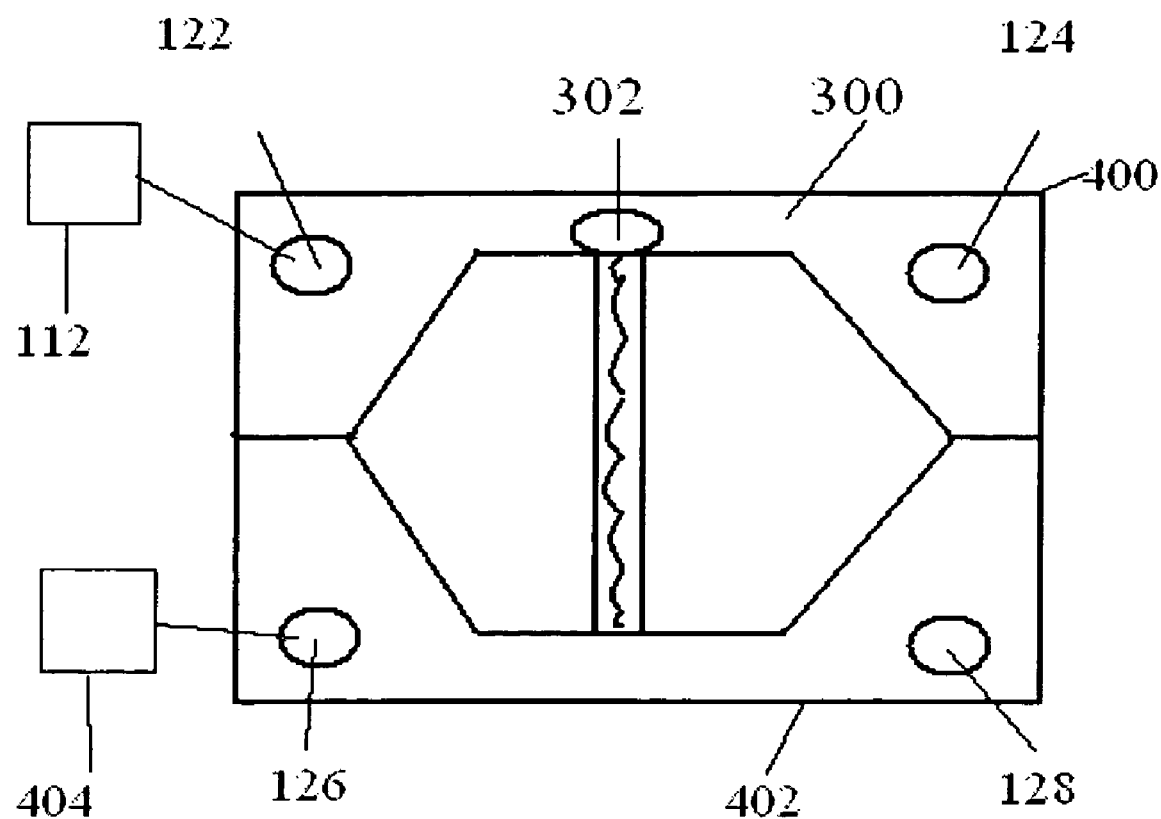
FIG. 12 depicts a front view of a housing usable in an embodiment of a fuel cell stack.

FIG. 12 depicts a front view of a sealable two-part housing (300) usable in an embodiment of a fuel cell stack. The housing (300) for the fuel cell stack can hold a plurality of single unit fuel cells, such as between 2 and 100 fuel cells, although generally between 5 and 10 fuel cells are housed on one fuel cell stack.

A threadable rod (302) is used to attach a top of the housing (400) to a bottom of the housing (402). A fuel intake (122) in communication with a fuel source (112) can provide fuel into the housing to flow into the plurality of connected fuel cells of the fuel cell stack. A fuel exhaust (124) provides for the release of the fuel exhaust gases from the plurality of connected fuel cells of the fuel cell stack. An oxidant intake (126) in communication with an oxidant source (404) can provide oxidant channels for an oxidant gas to flow into the plurality of connected fuel cells of the fuel cell stack, while an oxidant exhaust (128) provides for the release of the oxidant exhaust gases from the plurality of connected fuel cells of the fuel cell stack.

Figure 13:
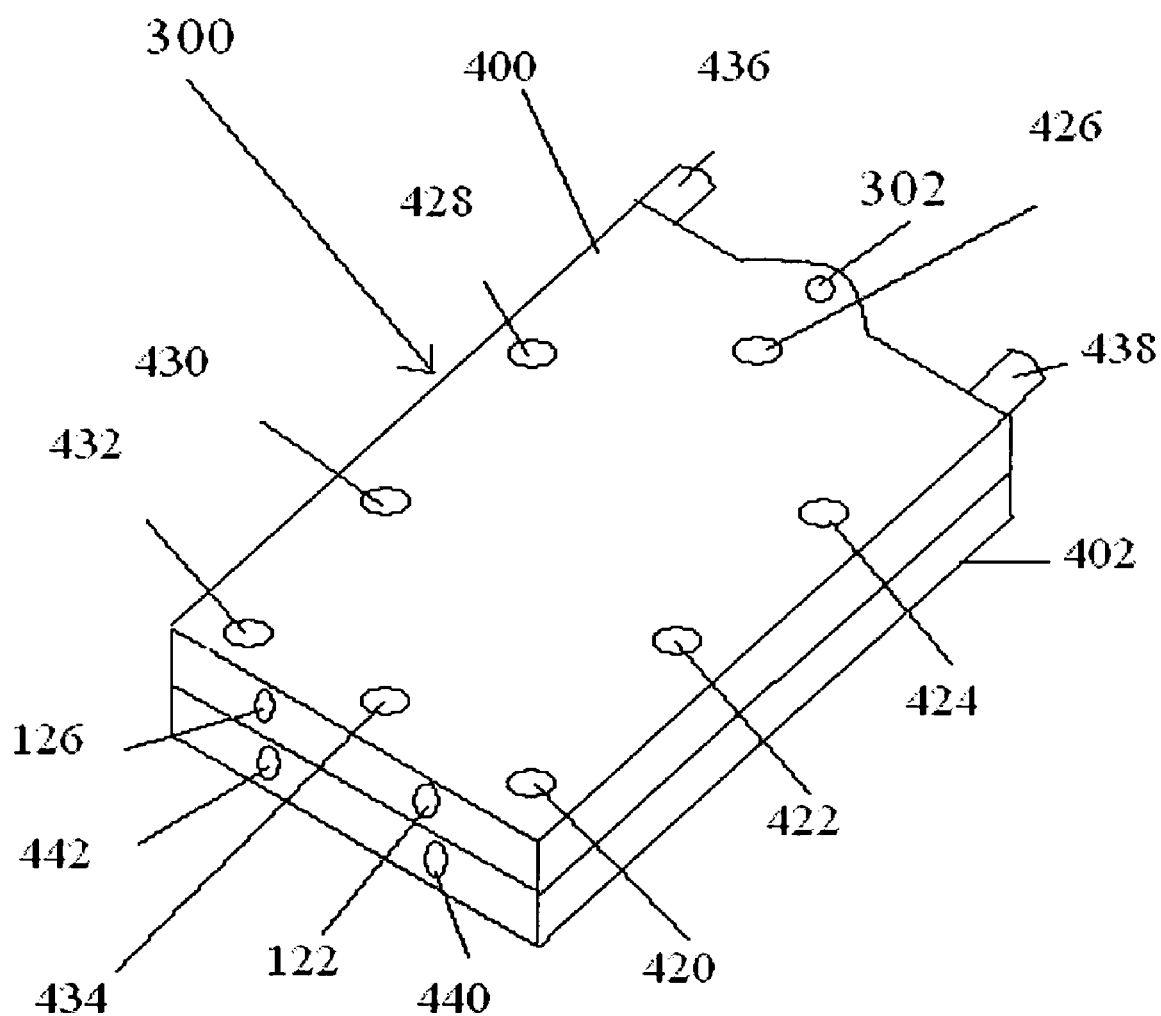
FIG. 13 depicts a top view of a housing usable in an embodiment of a fuel cell stack.

FIG. 13 depicts a top perspective view of a sealable two-part housing (300) usable in an embodiment of a fuel cell stack. A threadable rod (302) attaches a top of the housing (400) to the bottom of the housing (402). Mounting holes (420, 422, 424, 426, 428, 430, 432, 434) are located on the housing (300) securing the top (400) to the bottom (402) around the fuel cell stack.

A fuel intake (122) is shown. An oxidant intake (126) is shown. In an embodiment, the housing can include exhaust ports (440) for water and gases (442). An additional fuel intake (436) and a fuel exhaust (438) can be located on the housing.

While these embodiments have been described with emphasis on the embodiments, it should be understood that within the scope of the appended claims, the embodiments might be practiced other than as specifically described herein.

What is claimed is:

1. A fuel cell stack comprising:
   a. a plurality of connected fuel cells, wherein each fuel cell comprises:
      i. a membrane electrode assembly comprising:
         1. a proton exchange membrane disposed between a first carbon base and a second carbon base, and wherein an anode side is formed from between 0.1 milligrams/cm$^2$ and 0.3 milligrams/cm$^2$ of a first catalyst on a side of the first carbon base disposed adjacent to the proton exchange membrane and a cathode side is formed from between 0.3 milligrams/cm$^2$ and 0.6 milligrams/cm$^2$ of a second catalyst on a side of the second carbon base disposed adjacent to the proton exchange membrane;
         2. a gasket disposed around an edge of the proton exchange membrane for sealing the sides of the proton exchange membrane without covering the anode side or the cathode side; and
         3. a first metalized collector deployed on the anode side and a second metalized collector deployed on the cathode side, wherein each metalized collector is shaped with a body, a projection, and a plurality of paths formed through each body for transmitting gases, wherein the first metalized collector is disposed adjacent to the first carbon base and the second metalized collector is disposed adjacent to the second carbon base, wherein the first metalized collector is in communication with the first carbon base and the proton exchange membrane and the second metalized collector is in communication with the second carbon base and the proton exchange membrane for forming the membrane electrode assembly;
      ii. a flexible fuel plenum disposed on a side of the membrane electrode assembly and a flexible oxidant plenum disposed on an opposite side of the membrane electrode assembly for forming an intermediate structure, wherein the intermediate structure is disposed between a fuel manifold and an oxidant manifold enabling the anode side to communicate with the fuel manifold and the cathode side to communicate with the oxidant manifold, wherein each flexible plenum comprises:
         1. a top central portion and a bottom central portion, wherein each central portion comprises a plurality of holes for transmitting a gas to each metalized collector;
         2. a plurality of nibs disposed in the top central portion and the bottom central portion for increasing turbulence in gases flowing over the top central portion and the bottom central portion; and
         3. a frame surrounding the top central portion and the bottom central portion, wherein the frame has a height equivalent to a portion of the plurality of nibs, wherein the frame provides a gas inlet passageway and a gas exhaust passageway, wherein each frame forms a seal when engaging another fuel cell, wherein fuel flows over the flexible fuel plenum to the first metalized collector and oxidant flows over the flexible oxidant plenum to the second metalized collector in forming an operational fuel cell;
   b. fuel cell connectors for connecting in series an anode from a first fuel cell in the fuel cell stack with a cathode from an adjacent fuel cell in the fuel cell stack or connecting in parallel a cathode from a first fuel cell in the fuel cell stack with a cathode from an adjacent fuel cell in the fuel cell stack forming a plurality of connected fuel cells;
   c. an anode load connector for connecting an unconnected anode of the plurality of connected fuel cells to a load;
   d. a cathode load connector for connecting an unconnected cathode of the plurality of connected fuel cells to a load;
   e. a housing for supporting the plurality of connected fuel cells, wherein the housing comprises:
      1. at least one fuel intake in communication with a fuel source for providing fuel into the plurality of connected fuel cells;
      2. at least one fuel exhaust for releasing fuel exhaust gases from the plurality of connected fuel cells;
      3. at least one oxidant intake in communication with an oxidant source for providing oxidant into the plurality of connected fuel cells; and
      4. at least one oxidant exhaust for releasing oxidant exhaust gases from the plurality of connected fuel cells;
   f. a fuel manifold engaging the at least one fuel intake and providing a sealing engagement with the plurality of connected fuel cells in the housing;

g. an oxidant manifold engaging the at least one oxidant intake and providing a sealing engagement with the plurality of connected fuel cells in the housing; and h. a controller with a processor in communication with the at least one fuel intake for monitoring and regulating fuel into the plurality of connected fuel cells and in communication with the at least one oxidant intake for monitoring and regulating oxidant flow into the plurality of connected fuel cells.

2. The fuel cell stack of claim 1, wherein at least one metalized collector further comprises:

a. a temperature sensor disposed on the projection;

b. a voltage sensor disposed on the projection;

c. a current sensor disposed on the projection; and d. a metalized collector processor with a memory for data storage disposed on the projection in communication with sensors disposed on the projection for forming a printed circuit board.

3. The fuel cell stack of claim 2, further comprising a power supply in communication with the processor for providing power during start-up of the fuel cell stack.

4. The fuel cell stack of claim 2, wherein the metalized collector processor has a database storage and a memory with computer instructions, wherein the computer instructions comprise steps for instructing the metalized collector processor to monitor and regulate a temperature, a voltage, a current, a humidity, a gas flow, and combinations thereof, based on pre-set limits stored in the database storage.

5. The fuel cell stack of claim 2, further comprising a pressure sensor disposed on the at least one metalized collector within the body and in communication with the metalized collector processor of the at least one metalized collector.

6. The fuel cell stack of claim 1, wherein each metalized collector comprises a layer of between 1 micro-inch and 2 micro-inches of an inert metal capable of resistance to degradation in the presence of a strong acid.

7. The fuel cell stack of claim 6, wherein the layer on each metalized collector is made up of a member selected from the group consisting of: a gold, a gold alloy, and combinations thereof.

8. The fuel cell stack of claim 1, wherein each catalyst is a member selected from the group consisting of: a platinum catalyst, a ruthenium catalyst, and combinations thereof.

9. The fuel cell stack of claim 1, wherein the plurality of paths in each metalized collector covers between 40% and 60% of each metalized collector.

10. The fuel cell stack of claim 1, further comprising a needle connecting the gas inlet passageway to a hydrogen tank for supplying fuel to the plurality of connected fuel cell.

11. The fuel cell stack of claim 1, further comprising a needle connecting the gas inlet passageway to a reformer for supplying fuel to the fuel cell, wherein the reformer converts a hydrogen carrying fuel to hydrogen.

12. The fuel cell stack of claim 1, wherein the proton exchange membrane is a member selected from the group consisting of: a proton permeable membrane, an electrically insulating membrane, a perfluorosulphonic acid based hydrophilic membrane, and combinations thereof.

13. The fuel cell stack of claim 1, wherein each fuel cell produces a current density of at least 350 milli-Amps (mA) per square centimeter at a nominal voltage of about 0.5 volts.

14. The fuel cell stack of claim 1, wherein each fuel cell has an electrical output of at least 10.5 watts.

15. The fuel cell stack of claim 1, wherein the housing is a sealable two-part housing for supporting the fuel manifold in a position opposite the oxidant manifold.

16. The fuel cell stack of claim 15, wherein the sealable two-part housing provides support for the membrane electrode assembly and the flexible plenums of each fuel cell, wherein the sealable two-part housing further comprises:

a. a fuel intake port with a fuel channel in communication with the fuel manifold;

b. an oxidant intake port in communication with an oxidant channel in communication with the oxidant manifold;

c. a fuel exhaust port in communication with the flexible fuel plenum; and d. an oxidant exhaust port in communication with the flexible oxidant plenum.

17. The fuel cell stack of claim 16, wherein the sealable two-part housing compresses each flexible plenum to the membrane electrode assembly for providing communication between the plurality of nibs and the first metalized collector on the anode side and the plurality of nibs and the second metalized collector on the cathode side.

18. The fuel cell stack of claim 1, wherein the fuel manifold and the oxidant manifold are wedge shaped.

19. The fuel cell stack of claim 1, wherein the plurality of nibs increases communication between the first metalized collector and the first carbon base on the anode side and the second metalized collector and the second carbon base on the cathode side.

20. The fuel cell stack of claim 1, wherein the fuel cell connectors engage the projections of the first metalized collector and the projection of the second metalized collector of each fuel cell forming an electrical circuit for operating the fuel cell stack and for providing a power removal circuit for facilitating removal of created power from the fuel cell stack.

* * * * *